(12) United States Patent
Deuser et al.

(10) Patent No.: US 6,816,864 B2
(45) Date of Patent: Nov. 9, 2004

(54) SYSTEM AND METHOD FOR HANDLING SET STRUCTURED DATA THROUGH A COMPUTER NETWORK

(75) Inventors: Mark Wyatt Deuser, Apex, NC (US); Wyn Gordon Easton, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 09/745,584

(22) Filed: Dec. 21, 2000

(65) Prior Publication Data

US 2002/0083087 A1 Jun. 27, 2002

(51) Int. Cl.$^7$ .............................................. G06F 17/30
(52) U.S. Cl. .............................. 707/100; 707/3; 707/10; 709/217
(58) Field of Search .............................. 707/10, 100, 2, 707/3, 501, 7, 104.1, 205, 201; 709/217, 203, 245; 717/107

(56) References Cited

U.S. PATENT DOCUMENTS

| | | | | |
|---|---|---|---|---|
| 5,765,154 A | * | 6/1998 | Horikiri et al. | 707/10 |
| 5,987,480 A | * | 11/1999 | Donohue et al. | 715/501.1 |
| 6,199,068 B1 | * | 3/2001 | Carpenter | 707/100 |
| 6,317,781 B1 | * | 11/2001 | De Boor et al. | 709/217 |

* cited by examiner

Primary Examiner—Charles Rones
Assistant Examiner—Hassan Mahmoudi
(74) Attorney, Agent, or Firm—Gerald R. Woods; Joseph T. VanLeeuwen

(57) ABSTRACT

A system and method for handling set structured data through a computer network is disclosed. A client computer sends a request to retrieve or set data maintained by a Web application server. The client request is in a text format. The Web application server uses the action requested by the client and the data item being requested to determine a method name. Java reflection is used to invoke the method to retrieve or set the data value. In addition, text data received from the client computer is converted to the appropriate data type before storing in the data store, such as an LDAP directory. Data retrieved from the data store is also converted from the data item's data type to a Java text string that is included in an HTML Web page and returned to the client for display to the user.

27 Claims, 6 Drawing Sheets

SYSTEM AND METHOD FOR HANDLING SET STRUCTURED DATA THROUGH A COMPUTER NETWORK

BACKGROUND OF THE INVENTION

1. Technical Field

The present invention relates in general to a method and system for retrieving and setting set structured data through the Internet. More particularly, the present invention relates to a system and method using Java and XML to manage LDAP data sources.

2. Description of the Related Art

Companies and other organizations are increasingly turning to computer networks, especially the Internet, for distributed applications. Applications, in turn, are often driven by data. This data can be stored in a variety of formats. Flat files can be used, however they provide little support in managing data files, especially as the application data files become large. Traditional database management systems (DBMS), such as a relational or hierarchical database can be used. An example of a relational database is IBM's DB2™ product and an example of a hierarchical database is IBM's IMS™ database product. While a DBMS is excellent at storing and retrieving data and has rich access methods, including use of a Structured Query Language (SQL), a DBMS is not always the right choice when dealing with large distributed systems where speed is often a critical factor and client computing resources are often limited. An emerging protocol for managing data is the Directory Access Protocol (DAP). Directory services, such as DAP, are fast becoming the key to many organizations, allowing applications to locate the resources they need and enabling network administrators to authenticate end-users.

DAP runs over the OSI (Open System Interconnection) network protocol stack—that, combined with its rich data model and operation set makes it somewhat cumbersome and difficult to implement a full-blown DAP client and have it installed on smaller computer systems. X.500 is an overall model for Directory Services in the OSI environment. The model encompasses the overall namespace and the protocol for querying and updating it.

In response to DAP's shortcomings, LDAP, or "Lightweight Directory Access Protocol" was developed. LDAP is, like X.500, both an information model and a protocol for querying and manipulating stored data. LDAP's overall data and namespace model is essentially that of X.500. The major difference is that the LDAP protocol itself is designed to run directly over the TCP/IP stack, and it lacks some of the more esoteric DAP protocol functions.

A major part of X.500 is that it defines a global directory structure. It is essentially a directory Web in much the same way that HTTP and HTML are used to define and implement the global hypertext Web. Anyone with an X.500 or LDAP client may examine the global directory just as they can use a Web browser to examine the global Web.

LDAP is not a replacement for traditional database management systems and is not a substitute for a file system, nor is it a replacement for domain name servers (DNS).

LDAP was initially a low-cost, PC-based front-end for accessing X.500 directories. When the ISO standard proved too cumbersome and overhead-intensive to be widely adopted, LDAP emerged to fill the gap, expanding its original role. The IETF (Internet Engineering Task Force) specification rapidly became the solution of choice for all types of directory services applications on networks using the Internet protocol (IP).

LDAP applications can be loosely grouped into four categories: those that locate network users and resources, those that manage them, those that authenticate and secure them, and any other application that manages data but, for one reason or another, does not use a traditional DBMS. LDAP can save companies time and money. It can help network managers keep pace with the rising demand for directory services. New applications appear every day, but there are currently limits to what the protocol can do for distributed computing. For example, traditional LDAP solutions cannot store all the types of information used by network applications.

The current LDAP specification includes eight features and functions for defining or performing directory-related tasks, such as data storage and retrieval. LDAP uses an information model organized according to collections of attributes and values, known as entries. This model defines what kinds of data can be stored and how the data behaves. For example, a directory entry representing a person named "John Doe" might have an attribute called sn (surname) with a value of "Doe". The information model, inherited almost unchanged from X.500, is extensible almost—any kind of new information can be added to a directory.

The LDAP schema defines the actual data elements that can be stored in a particular server and how they relate to real-world objects. Collections of values and attributes-representing objects such as countries, organizations, people, and groups are defined in the standard, and individual servers can define new schema elements as well.

The LDAP naming model specifies how information is organized and referenced. LDAP names are hierarchical; individual names are composed of attributes and values from the corresponding entry. The top entry typically represents a domain name, company, state, or organization. Entries for subdomains, branch offices or departments come next, often followed by common name (cn) entries for individuals. Like the LDAP information model, the naming model is derived directly from X.500. Unlike X.500, LDAP does not constrain the format of the namespace; it allows a variety of flexible schemes.

The LDAP security model determines how information is secured against unauthorized access. Extensible authentication allows clients and servers to prove their identity to one another. Confidentiality and integrity also can be implemented, safeguarding the privacy of information and protecting against active attacks like connection hijacking.

The LDAP functional model determines how clients access and update information in an LDAP directory, as well as how data can be manipulated. LDAP offers nine basic functional operations: add, delete, modify, bind, unbind, search, compare, modify DN (distinguished name), and abandon. Add, delete, and modify govern changes to directory entries. Bind and unbind enable and terminate the exchange of authentication information between LDAP clients and server, granting or denying end-users access to specific directories. Search locates specific users or services in the directory tree. Compare allows client apps to test the accuracy of specific values or information using entries in the LDAP directory. Modify DN makes it possible to change the name of an entry. Abandon allows a client application to tell the directory server to drop an operation in progress.

The LDAP protocol defines how all of the preceding models and functions map onto TCP/IP (Transmission Control Protocol/Internet Protocol). The LDAP protocol specifies the interaction between clients and servers and determines how LDAP requests and responses are "formed" (the structure of the data on the transmission path). For example, the LDAP protocol stipulates that each LDAP request is carried in a common message format and that entries contained in response to a search request are transported in separate messages, thus allowing the streaming of large result sets.

The LDAP application program interface (API) details how software programs access the directory, supplying a standard set of function calls and definitions. This API is widely used on major development platforms running C/C++, Java, Javascript, and Perl (among others).

The LDAP data interchange format (LDIF) provides a simple text format for representing entries and changes to those entries. This ability helps synchronize LDAP directories with X.500 and proprietary directories (or a company's HR directory, which is often a source of useful information).

LDAP describes what a directory looks like and how it acts from a client's point of view. However, the directory itself can be distributed across many servers. Each of these servers can maintain a version of the entire directory, which is replicated periodically so that all servers can determine where data is located. An LDAP server that receives a request from an application takes responsibility for the request. It may pass the request to other servers until it can be fulfilled, or it may refer the client to other servers.

Replication of directory data is also required for high availability networks. Consider a directory supplying the authentication database for a business-critical Web application. If the directory is down, the Web application cannot authenticate users, which results in lost business. One way to reduce the risk is to make two or more copies of the directory data, each served by a separate machine. If one copy becomes inaccessible, the other can take over.

Another challenge with LDAP is standard access control. LDAP currently offers a standard way for servers and clients to authenticate each other (via the bind operation). However, there is no standard way to use this information to control access to specific directory data. Thus, there is no standard way for LDAP to ensure that each database replica follows the same rules for access control.

The LDAP schema itself faces various challenges. LDAP defines basic elements for a number of fundamental applications (such as white pages, e-mail, and user and group management). However, as directories become increasingly prevalent and the number of applications relying on them increases, there is a corresponding need for new schema.

While it's not possible to describe all of LDAP's uses, a representative sampling conveys an idea of its versatility. LDAP location applications are becoming widespread. In this capacity, LDAP directories play the role of network-accessible database, organizing and indexing information. For example, the address book in many e-mail clients employs LDAP to locate addresses. Every time a user browses the member directory at a Web site, or a consumer scans the bestseller lists of an online bookstore, an LDAP directory is probably being used behind the scenes.

A simple but compelling example of LDAP's value as resource locator is the online corporate phone directory. Because many corporate directories are updated regularly—often by users themselves—an online phone directory increases the accuracy of available information. In addition, by eliminating costly printing, an online corporate phone directory can save a large corporation thousands of dollars a year.

LDAP also plays a critical role in network management, where it can be quite useful to system administrators. Without LDAP, corporate network administrators have to maintain duplicate user information in several of application-specific directories across the network. With LDAP, it's possible to centralize this information in a single directory accessed by all applications Manufacturing companies with many suppliers or branch offices can use LDAP directories to deploy Web-based applications that integrate sales, inventory, and delivery processes. One repository—which can even be shared among different companies—eliminates the need for separate directories and complicated synchronization.

LDAP also plays an important role in providing security, with the directory acting as gatekeeper and deciding which user has access to various resources. In this capacity, LDAP performs two critical jobs. First, it serves as an authentication database. Second, once the identity of a user has been established, it controls access to resources, applications, and services (using stored policies and other information).

LDAP also permits corporate network administrators to use directories to implement PKI (public key infrastructure) security. From the user's point of view, LDAP provides the directory in which the certificates of other users are found, enabling secure communication. From the administrator's point of view, LDAP directories are the way in which certificates can be centrally deployed and managed.

While LDAP data stores are useful, they present certain challenges when dealing with a client computer system. Client computer systems primarily use Web browsers to display text. This text is often formatted using a language, such as the Hypertext Markup Language (HTML) that is interpreted by the client's Web browser. Web browsers often handle text well, yet have difficulty handling other types of data such as integers, floating point data, and other data types. In addition, Web browsers contain little inherent ability to handle or manage LDAP data stores.

What is needed, therefore, is a way to receive textual information from a client computer system and store it in an LDAP data store with a particular data type. In addition, what is needed is a flexible way to retrieve typed data from an LDAP data store and return the data to a client as textual information.

SUMMARY

It has been discovered that managing distributed data stores, such as databases and directories, can be improved using a layered approach that provides a unique interface to the data store. The layers included in the approach include a client handling layer, a data conversion layer, and a data store interface layer.

The client handling layer receives requests from clients over a computer network, such as the Internet. In one embodiment, the client handling layer includes a browser servlet. The browser servlet receives requests from clients, such as users using a browser on a personal computer connected to the Internet. The browser servlet builds a document describing the data being requested or stored by the client. In one embodiment, the document includes an Extensible Markup Language (XML) document and includes information about the field name, the action to take on the data field, the type of data, and a textual representation of a data value (if the data value is being stored by the client). The document describing the data is passed to the data conversion layer for further processing.

The data conversion layer receives the document describing the data, determines the action to perform on the data, and identifies and invokes a process to perform the action. In one embodiment, the data conversion layer includes an XML servlet layer that processes an XML document received from the browser servlet layer. In the XML servlet, reflection is used to locate a method for handling the data. In this embodiment, methods are named according to the function they perform and the data field they operate against. For example, a method to retrieve a field named address is named "getAddress" and the method used to store an address is named "setAddress". A "get" and a "set" method exist for all fields that the client can retrieve or store in the data store. In one embodiment, Java "reflection" is used to identify a matching method. The data conversion layer passes the request to a data store interface layer where the data is retrieved or stored as requested by the client.

The data store interface layer includes procedures for storing and retrieving data from the data store. In one embodiment, the data store includes a Lightweight Directory Access Protocol (LDAP) storage area. The data store interface layer, referred to as an LDAP Interface Layer, performs actions on the data by performing methods used to get and set fields. In this embodiment, when a field is being retrieved, it is stored as a Java object that is returned to the XML servlet layer. The XML servlet layer determines how to convert the returned Java object to a text string. The text string is stored in an XML document that is returned to the client handling layer (browser servlet layer). The browser servlet layer uses the data contained in the XML document to prepare a page to return to the client. In one embodiment, a Hypertext Markup Language (HTML) document is prepared that is sent to the client. The HTML document is displayed on the client's computer system using standard browser software.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
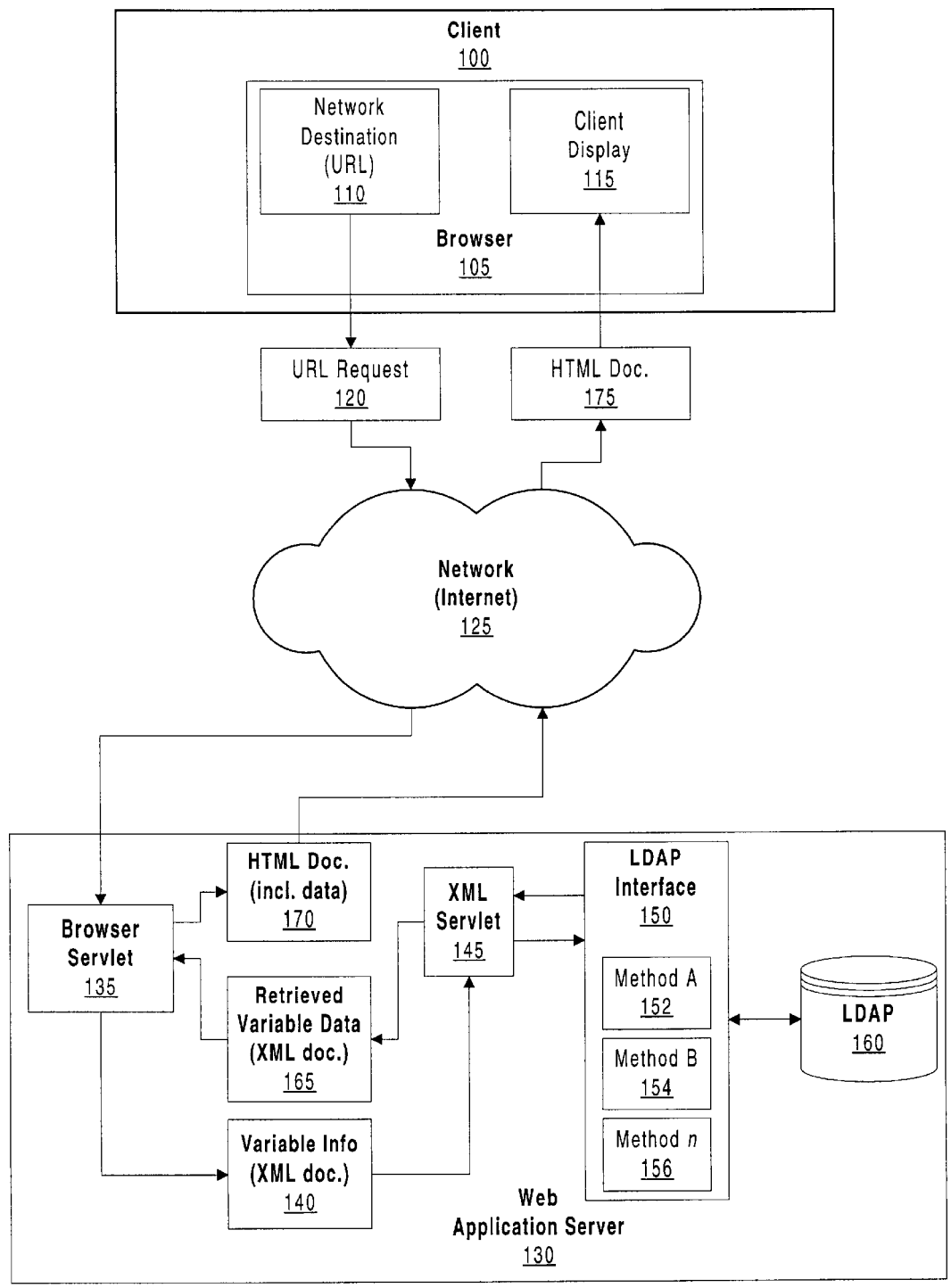
FIG. 1 is a system diagram including a client and a Web application server communicating via a computer network.

FIG. 1 shows a system diagram including a client and a Web application server communicating via a computer network. Client computer system 100 includes Web browser 105, such as Netscape Navigator™ and Microsoft Internet Explorer™. Browser 105 includes network destination 110. In an Internet setting, network destination may be a Uniform Resource Locator (URL), which is an address for a resource (such as a file or Web page) on the Internet. An address field is often provided on a Web browser for the user to enter network destination 110. In addition, network destination 110 may be saved in a file, such as a bookmark file, stored on client computer system 100. Another way that a user can enter a network destination is by selecting (using a mouse or selecting device) a hyperlink displayed in client display 115 within browser 105.

When a network destination is entered by client 100, URL request 120 is sent to computer network 125. Computer network 125 includes any network used to connect computer systems to one another, including the Internet. Based on the address included with URL request 120, the client's request is received by Web application server 130. Web application server 130 includes various layered components for handling the client's request. Browser servlet 135 receives the client's request and prepares an Extensible Markup Language (XML) document 140 that includes information about the client's data request. The client's data request may be to retrieve data from a data store accessible through the Web application server 130 or store data in such a data store. Information about the client's data request includes the action that the client is requesting, the data area name, or field name, that the client is wishing to retrieve or store, the type of data corresponding to the data area name (such as integer or string), and a textual representation of a data value (when the client is requesting to store data).

A second layer, handled by XML servlet 145 processes XML document 140. XML servlet 145 determines a method that is used to handle the data request. In one embodiment, XML servlet 145 is implemented in Java and uses Java reflection to determine the method. A method name is determined by combining the action being requested (such as "get" or "set") with a data area name (such as "StreetAddress") The combined name, such as "getStreetAddress", is used to query a Java class to locate a correspondingly named Java method. The identified Java method is then used to perform the data request, such as getting a street address from the data store. In the example shown, LDAP Interface 150 includes Java methods for performing data requests. LDAP Interface 150 is shown including numerous methods (method A 152, method B 154, and method n 156). In one embodiment, LDAP Interface 150 includes a "get" and a "set" method for each data item being retrieved or stored in LDAP data store 160. When the corresponding method is invoked, data is either retrieved from or stored to LDAP data store 160 depending on the action being requested by the client.

When data is retrieved from LDAP data store 160, XML servlet 145 converts the retrieved data into a textual string that can be handled by client Web browser 105. The retrieved and converted data is placed in XML document 165. While two XML documents (XML doc. 140 and XML doc. 165) are shown for clarity, the same XML document can be used to store the retrieved and converted data. The browser servlet creates HTML document 170 which includes any retrieved and converted data. The retrieved and converted data is read by browser servlet 135 from XML document 165. Once the HTML document is prepared, it is returned to client 100 across computer network 125.

Client computer system 100 receives HTML document 175 from computer network 125. Browser 105 is capable of reading the formatting tags included in HTML document 175 and displaying a formatted document to the user in client display 115. In a windowed operating environment, client display 115 would be a window visible within a physical display included with client computer system 100. While HTML (Hypertext Markup Language) is shown as the language used to provide result information to client 100, other languages or even a raw stream of data can be used to provide client 100 with the resulting information.

Figure 2:
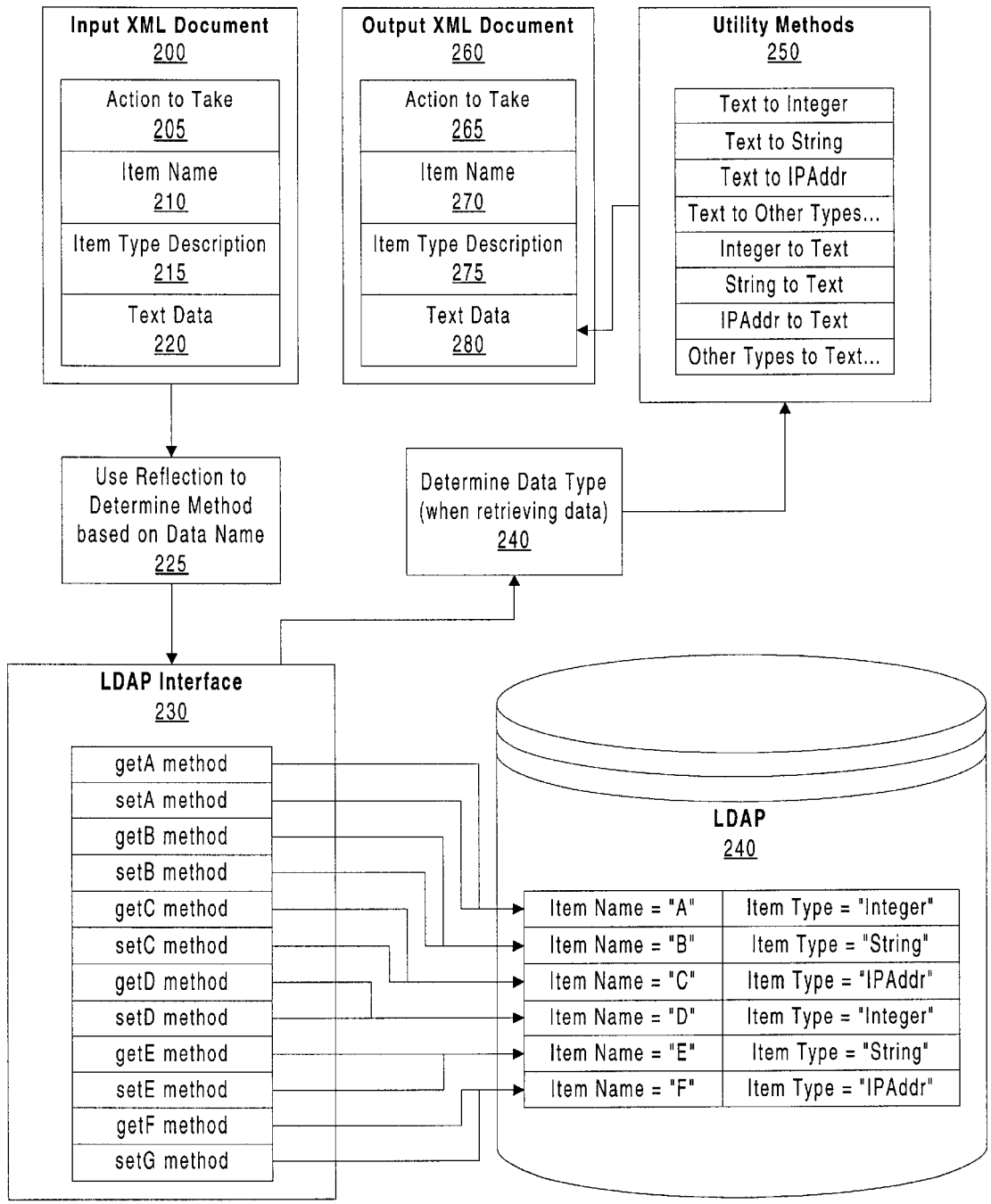
FIG. 2 is a block diagram showing the interaction between components in retrieving or storing data.

FIG. 2 shows a block diagram of the interaction between components in retrieving or storing data. Input XML document 200 includes information about the data request received from the client. Input XML document 200 includes action 205 (such as "get" or "put") to take on the data, item name 210 (such as "StreetAddress" or "CustomerName") describing the data area or field from which data will be retrieved or to which data will be stored. Input XML document 200 also includes item type description 215 (such as "integer" or "string") that describes the type of data corresponding to item type 210, and also includes textual data 220 (such as "John Doe") that provides a textual data value that is used when storing (or "setting") data into the data store.

Process 225 is used to determine which method to use from LDAP Interface 230. In a Java implementation, reflection can be used to dynamically determine a method to use to handle the client request. For example, if action 205 is "get" and item name 210 is "A", these are combined to form method name "getA". Reflection is used to identify a method named "getA" within LDAP Interface 230. This method is used to get (i.e., retrieve) an item named "A" from LDAP data store 240. The corresponding data is returned whereupon process 240 determines the type of data that was returned. In one Java implementation, the Java 'instanceof' is used to examine the returned data to determine if the returned data is an integer, string, or other data type. Once the type of data is determined, one of the utility methods 250 is used to convert the returned data to text data. Output XML document 260 includes the same fields as input XML document 200 (action 265, item name 270, item type 275, and text data 280). The returned and converted data is stored as text data 280 for further processing and eventual return to the client. While input XML document 200 and output XML document 260 are shown as two separate documents for clarity, a single XML document can be used for both functions.

When data is being stored, input XML document includes a "set" request as action 205 and also includes a textual representation of the data to store in text data 220. Again, reflection is used to determine the method within LDAP Interface 230 to use to perform the storing. For example, if the item name is "A" then the method that would be used is "setA". In one embodiment, text data 220 that the client is requesting to store is converted using utility methods 250 before storing the data. In another embodiment, the methods used to set data are designed to handle a text string as input and convert the data appropriately before storing in LDAP data store 250.

Figure 3:
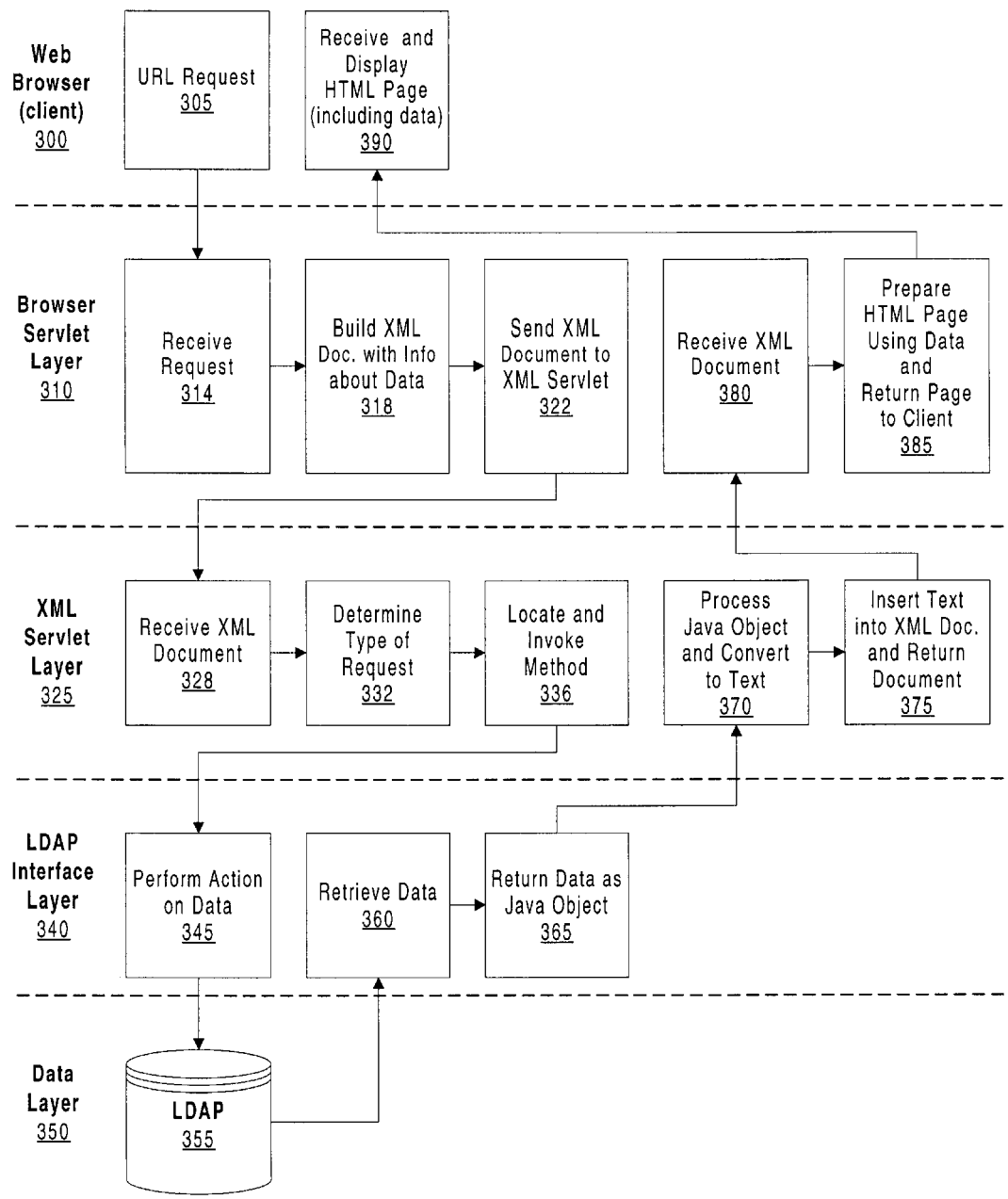
FIG. 3 is a block diagram showing interaction between layers in retrieving and storing data.

FIG. 3 shows a block diagram of the interaction between layers in retrieving and storing data. Web browser, or "client," layer 300 provides URL request (step 305) from the client to the Web application server. The Web application server uses browser servlet layer 310 to communicate with the client. Browser servlet layer 310 receives the client's request (step 314) and builds an XML document using information about the data and the client's request (step 318). The XML document is sent to the XML servlet layer for further processing (step 322).

XML servlet layer 325 processes XML documents that are used to provide data requests and results. XML servlet layer 325 receives (step 328) an XML document from the browser servlet layer. The XML servlet layer determines (step 332) the type of request (i.e., "set" or "get") based on data within the XML document. The type of action being requested and the item name being acted upon are used to locate and invoke the appropriate method (step 336) from the LDAP Interface layer.

LDAP Interface layer 340 performs an action (step 345) on data store 355 that resides within data layer 350. Data is retrieved (step 360) and returned to XML servlet layer 325 as a Java object (step 365).

XML servlet layer 325 receives and processes the returned Java object (step 370). The processing includes locating a utility to convert the returned object to a Java string (i.e., text). The XML servlet inserts the text into an XML document and returns the XML document (step 375) to browser servlet layer 310. Browser servlet layer 310 receives (step 380) the XML document from XML servlet layer 325 and prepares and returns an HTML page (step 385) including text data for display on the client display. Client 300 receives and displays (step 390) the HTML page that includes any requested data as text.

Figure 4:
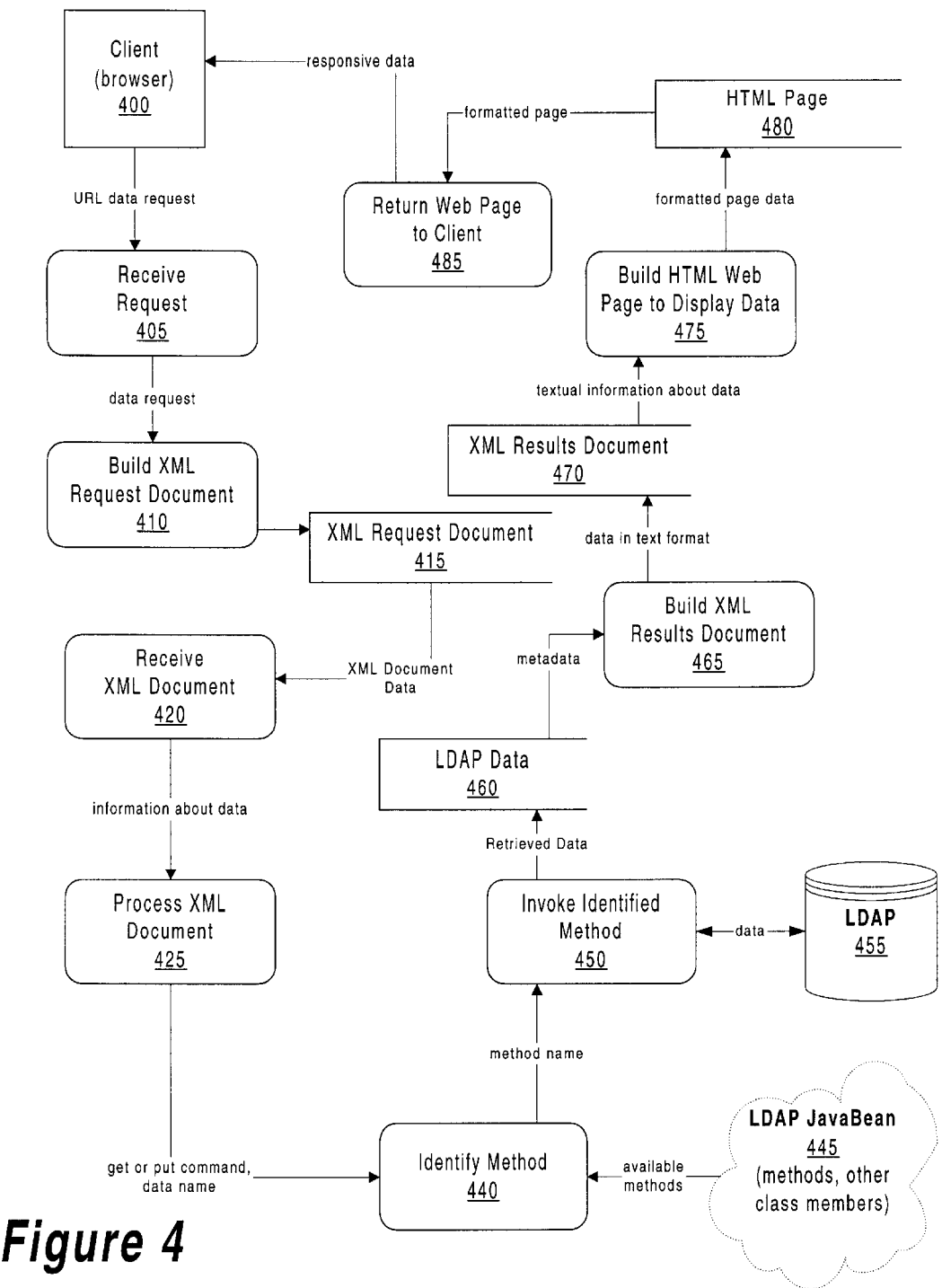
FIG. 4 is a dataflow diagram showing data flowing between the client and various processes included in the system.

FIG. 4 shows a dataflow diagram depicting the data flowing between the client and various processes included in the system. Client 400 sends a URL data request to a Web application server. The Web application server receives request (process 405). The data request is used to build (process 410) XML request document (data store 415). The XML document is received (process 420) and processed (process 425). The action and item name are used to identify the method used to handle the data request (process 440). Reflection is used to identify the method from LDAP JavaBean 445 that includes various methods for storing and retrieving data from the data store. The identified method is invoked (process 450) whereupon data is retrieved from or written to LDAP data store 455. Retrieved data is stored in a Java object (data store 460). Java object data store 460 is used to build (process 465) an XML results document (data store 470). Note that XML results document 470 may be the same data store as XML request document 415. XML results document 470 is used to build (process 475) an HTML Web page (data store 480) to display the resulting data to the client. The HTML Web page is returned to the client (process 485) where it can be viewed by the client using Web browsing software.

Figure 5:
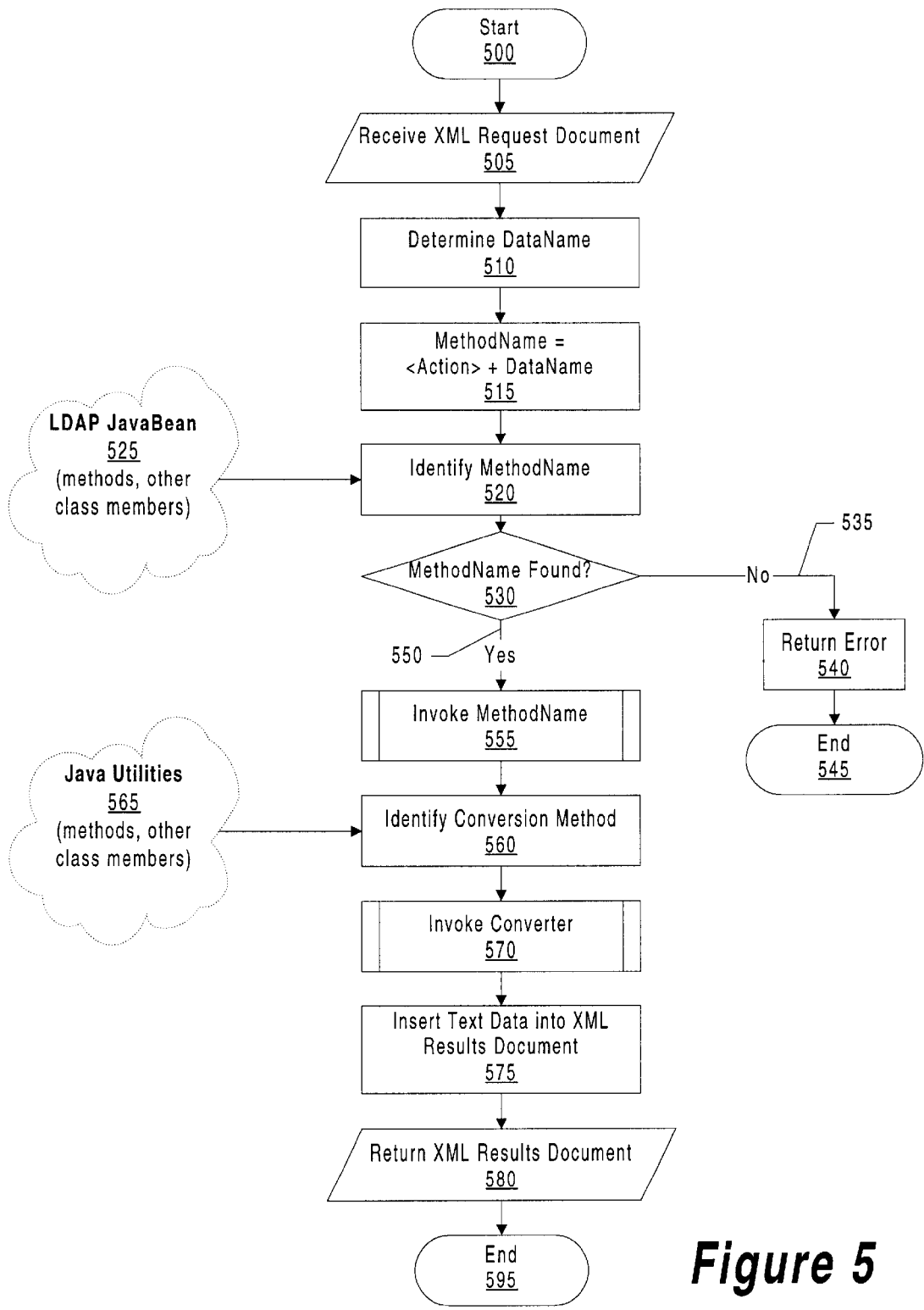
FIG. 5 is a flowchart showing the interface with the data store and conversion of retrieved data to textual strings.

FIG. 5 shows a flowchart of the steps involved with storing and converting data to and from the data store. Processing commences at 500 whereupon an XML request document is received (input 505). The name of the data item being stored or retrieved is determined along with the action being requested (step 510). A method name that corresponds to the action being requested and the data name is formed (step 515). For example, if the action being requested is "set" and the data name is "CustomerName", then the resulting method would be "setCustomerName". The formed method name is used to identify (step 520) a method within LDAP JavaBean 525. If the method name is not found, decision 530 branches to "no" branch 535 whereupon an error is returned (step 540) and processing of the XML document terminates at 545.

On the other hand, if the method name is found, decision 530 branches to "yes" branch 550 whereupon the method is invoked (predefined process 555) to handle the data request. If data is being returned to the client, a conversion method is identified (step 560). In one embodiment, the type of conversion is identified with the Java instanceof operation to determine the type of data returned from the LDAP data store. Java utilities 565 include utilities for converting various types of data into a Java string (i.e., text). The identified converter is invoked (predefined process 570) and the resulting Java string (text) is stored in an XML results document (step 575). The XML results document may be the same document as the XML request document received at 505. The XML results documents is returned to the calling process (output 580) for further processing and eventual return of any retrieved data to the client.

Figure 6:
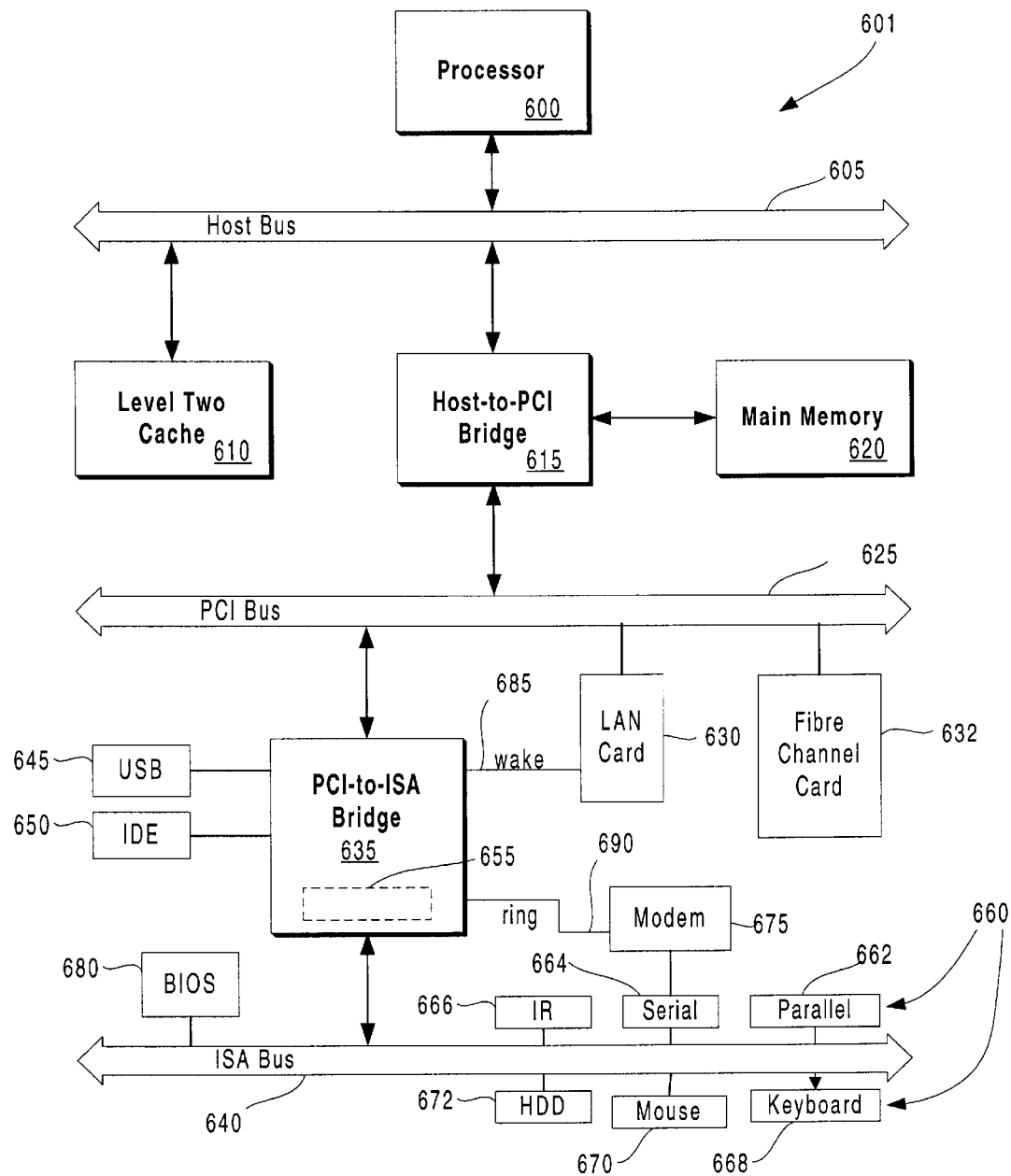
FIG. 6 is a block diagram of an information handling system capable of implementing the present invention.

FIG. 6 illustrates information handling system 601 which is a simplified example of a computer system capable of performing the server and client operations described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (HDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 to another computer system to copy files over a network, LAN card 630 is coupled to PCI bus 625 and to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method of managing a data store, said method comprising:

determining an action to perform on a data item within the data store;

combining an action name corresponding to the action with a data item name corresponding to the data item to form a method name;

performing a method corresponding to the formed method name;

receiving a request from a client, the request including the action name corresponding to the action, the data name corresponding to the data item, and a data value corresponding to the data item;

determining a data type corresponding to the data item;

converting the received data value to a converted data value based upon the determined data type;

storing the converted data value in an area of the data store corresponding to the data item; and writing the action name, the data item name, and the data value to an XML document prior to the storing.

2. The method as described in claim 1 further comprising:

comparing the formed method name to a plurality of methods included in an object.

3. The method as described in claim 1 wherein the determining further comprises:

receiving a request from a client, the request including the action name corresponding to the action and the data item name corresponding to the data item.

4. The method as described in claim 1 further comprising:

receiving a data value to store in the data item;

wherein the performing further includes:

storing the data value in the data store in an area corresponding to the data item.

5. The method as described in claim 4 further comprising:

determining an item type corresponding to the data item; and converting the received data value from a text type to the item type.

6. The method as described in claim 1 further comprising:

retrieving a data value from an area corresponding to the data item in the data store; and returning the data value to a client computer.

7. The method as described in claim 6 further comprising:

determining an item type corresponding to the data item; and converting the retrieved data value from the item type to a text type prior to the returning.

8. The method as described in claim 1 further comprising:

receiving a request from a client computer system, the request including the action name corresponding to the action, and the data item name corresponding to the data item;

retrieving a data value from an area in the data store corresponding to the data item name;

determining a data type corresponding to the data item name;

converting the retrieved data value from the determined data type to a text type; and returning the convened data value to the client computer system.

9. The method as described in claim 8 further comprising:

storing the converted data value in an HTML document, wherein the returning includes sending the HTML document to the client computer system.

10. An information handling system comprising:

one or more processors;

a memory accessible by the processors;

one or more nonvolatile storage devices accessible by the processors;

a data store stored on at least one of the nonvolatile storage devices; and a data management tool to manage the data store executable by the processors, the data management tool including:

means for determining an action to perform on a data item within the data store;

means for combining an action name corresponding to the action with a data item name corresponding to the data item to form a method name;

means for performing a method corresponding to the formed method name;

means for receiving a request from a client, the request including the action name corresponding to the action, the data name corresponding to the data item, and a data value corresponding to the data item;

means for determining a data type corresponding to the data item;

means for converting the received data value to a converted data value based upon the determined data type;

means for storing the converted data value in an area of the data store corresponding to the data item; and means for writing the action name, the data item name, and the data value to an XML document prior to the storing.

11. The information handling system as described in claim 10 further comprising:

means for comparing the formed method name to a plurality of method names included in an object.

12. The information handling system as described in claim 10 wherein the means for determining further comprises:

means for receiving a request from a client, the request including the action name corresponding to the action and the data item name corresponding to the data item.

13. The information handling system as described in claim 10 further comprising:

means for receiving a data value to store in the data item;

wherein the means for performing further includes:

means for storing the data value in the data store in an area corresponding to the data item.

14. The information handling system as described in claim 13 further comprising:

means for determining an item type corresponding to the data item; and means for converting the received data value from a text type to the item type.

15. The information handling system as described in claim 10 further comprising:

means for retrieving a data value from an area corresponding to the data item in the data store; and means for returning the data value to a client computer.

16. The information handling system as described in claim 15 further comprising:

means for determining an item type corresponding to the data item; and means for converting the retrieved data value from the item type to a text type prior to returning the data value to the client computer.

17. The information handling system as described in claim 10 further comprising:

means for receiving a request from a client computer system, the request including the action name corresponding to the action, and the data item name corresponding to the data item;

means for retrieving a data value from an area in the data store corresponding to the data item name;

means for determining a data type corresponding to the data item name;

means for converting the retrieved data value from the determined data type to a text type; and means for returning the converted data value to the client computer system.

18. The information handling system as described in claim 17 wherein further comprising:

means for storing the converted data value in an HTML document, wherein the returning includes means for sending the HTML document to the client computer system.

19. A computer program product stored on a computer operable media for managing a data store, said computer program product comprising:

means for determining an action to perform on a data item within the data store;

means for combining an action name corresponding to the action with a data item name corresponding to the data item to form a method name;

means for performing a method corresponding to the formed method name;

means for receiving a request from a client, the request including the action name corresponding to the action, the data name corresponding to the data item, and a data value corresponding to the data item;

means for determining a data type corresponding to the data item;

means for converting the received data value to a converted data value based upon the determined data type;

means for storing the converted data value in an area of the data store corresponding to the data item: and means for writing the action name, the data item name, and the data value to an XML document prior to the storing.

20. The computer program product as described in claim 19 further comprising:

means for comparing the formed method name to a plurality of method names included in an object.

21. The computer program product as described in claim 19 wherein the means for determining further comprises:

means for receiving a request from a client, the request including the action name corresponding to the action and the data item name corresponding to the data item.

22. The computer program product as described in claim 19 further comprising:

means for receiving a data value to store in the data item;

wherein the means for performing further includes:

means for storing the data value in the data store in an area corresponding to the data item.

23. The computer program product as described in claim 22 further comprising:

means for determining an item type corresponding to the data item; and means for converting the received data value from a text type to the item type.

24. The computer program product as described in claim 19 further comprising:

means for retrieving a data value from an area corresponding to the data item in the data store; and means for returning the data value to a client computer.

25. The computer program product as described in claim 24 further comprising:

means for determining an item type corresponding to the data item; and means for converting the retrieved data value from the item type to a text type prior to returning the data value to the client computer.

26. The computer program product as described in claim 19 further comprising:

means for receiving a request from a client computer system, the request including the action name corresponding to the action, and the data item name corresponding to the data item;

means for retrieving a data value from an area in the data store corresponding to the data item name;

means for determining a data type corresponding to the data item name;

means for converting the retrieved data value from the determined data type to a text type; and means for returning the converted data value to the client computer system.

27. The computer program product as described in claim 26 further comprising:

means for storing the converted data value in an HTML document, wherein the returning includes means for sending the HTML document to the client computer system.

\* \* \* \* \*